United States Patent
Tsuboi (10) Patent No.: US 9,894,149 B2
(45) Date of Patent: Feb. 13, 2018

(54) IMAGE PROCESSING APPARATUS, CONTROLLING METHOD OF IMAGE PROCESSING APPARATUS, AND STORAGE MEDIUM

(71) Applicant: CANON KABUSHIKI KAISHA, Tokyo (JP)

(72) Inventor: Masanori Tsuboi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/205,106

(22) Filed: Jul. 8, 2016

(65) Prior Publication Data

US 2017/0017438 A1   Jan. 19, 2017

(30) Foreign Application Priority Data

Jul. 14, 2015   (JP) ................. 2015-140749

(51) Int. Cl.
| | |
|---|---|
| *G06K 15/00* | (2006.01) |
| *H04L 29/08* | (2006.01) |
| *G06F 21/57* | (2013.01) |
| *H04N 1/00* | (2006.01) |
| *G06F 21/10* | (2013.01) |
| *G06F 21/60* | (2013.01) |

(52) U.S. Cl.
CPC ............. *H04L 67/10* (2013.01); *G06F 21/10* (2013.01); *G06F 21/57* (2013.01); *G06F 21/608* (2013.01); *H04N 1/00962* (2013.01); *G06F 2221/2101* (2013.01)

(58) Field of Classification Search
CPC ......... H04L 67/10; G06F 21/57; G06F 21/10; G06F 21/608; H04N 1/00962
USPC .......................................................... 358/1.14
See application file for complete search history.

(56) References Cited

U.S. PATENT DOCUMENTS

| | | | | |
|---|---|---|---|---|
| 2009/0161143 A1* | 6/2009 | Nakamoto | ......... | G06F 11/1433 358/1.14 |
| 2013/0179872 A1* | 7/2013 | Kuzmack | ................ | G06F 8/665 717/173 |

FOREIGN PATENT DOCUMENTS

JP     2004-234591 A     8/2004

* cited by examiner

*Primary Examiner* — Neil R McLean
(74) *Attorney, Agent, or Firm* — Cowan, Liebowitz & Latman, P.C.

(57) ABSTRACT

An image processing apparatus is provided that includes an acquisition unit configured to acquire information about an installed application if reservation information acquired from a server is reservation information about a distributed application; a first download unit configured to download the distributed application if the installed application matches the distributed application; a first update unit configured to update the installed application by using the distributed application; a second download unit configured to download firmware if the acquired reservation information is reservation information about the firmware; and a second update unit configured to execute an update using the firmware. If a state of the installed application is a stop state, the first update unit does not set the state of the application to a start state. If the state of the installed application is the start state, the first update unit sets the state of the application to the start state.

7 Claims, 10 Drawing Sheets

|  | State of license | State of application |
|---|---|---|
| 1 | Valid | Start |
| 2 | Valid | Stop |
| 3 | Expired | Stop |
| 4 | Not installed (with license information) | Stop |
| 5 | Not installed (without license information) | Stop |

FIG. 14

IMAGE PROCESSING APPARATUS, CONTROLLING METHOD OF IMAGE PROCESSING APPARATUS, AND STORAGE MEDIUM

BACKGROUND OF THE INVENTION

Field of the Invention

The present invention relates to an image processing apparatus, a controlling method of the image processing apparatus, and a storage medium.

Description of the Related Art

In recent years, in an image processing apparatus that is an example of information processing apparatuses placed in an office, a system in which an application for enhancing function (hereinafter, referred to as "application") is installed and the function of the image processing apparatus can dynamically be enhanced has been widely used. Examples of this type of system include MEAP (registered trademark) of Canon Inc. and the like.

There are cases in which, after releasing an application in the market, modifications including corresponding to vulnerabilities or bug fixing are added to the application, and the application is released again to the market as an updated version. There is a case in which a reliable update is requested for a version of the application in which an important modification is included. As a method of updating the application through the network, Japanese Patent Application Laid-Open No. 2004-234591 is disclosed. Japanese Patent Application Laid-Open No. 2004-234591 discloses a method in which an application list that is requested to be obtained is transmitted from a terminal device to an application distribution server, an application to be updated is specified on the application distribution server side based on the information, and it is distributed.

However, in Japanese Patent Application Laid-Open 2004-234591, the application cannot be updated if the application list that is requested to be obtained is not transmitted from the terminal device to the application server due to the conditions of security policy and the like, or if the application list cannot be transmitted. That is, updating the application is impossible if the information necessary for the update cannot be transmitted from the terminal device side.

SUMMARY OF THE INVENTION

The present invention provides an image processing apparatus that can update an application even if information necessary for an update cannot be transmitted to a server from an image processing apparatus side.

An image processing apparatus of the present invention comprises: an acquisition unit that is configured to acquire information of an installed application if reservation information acquired from a server is reservation information of a distributed application; a first download unit that is configured to download the distributed application if the installed application matches the distributed application; a first update unit that is configured to update the installed application by using the distributed application that has been downloaded by the first download unit; a second download unit that is configured to download firmware if the acquired reservation information is reservation information of the firmware; and a second update unit that is configured to execute an update using the firmware that has been downloaded by the download unit, wherein, if a state of the installed application before an update using the distributed application is a stop state, the first update unit does not set the state of the application to a start state, in order to make a state of the application after an update using the distributed application a stop state, and wherein, if a state of the installed application before an update using the distributed application is a start state, the first update unit sets the state of the application after an update using the distributed application to a start state.

According to the present invention, it is possible to provide an image processing apparatus that can update an application even if information necessary for an update cannot be transmitted to a server from an image processing apparatus side. Therefore, it is possible to reliably execute the update of the application without transmitting application information that has been installed in the image processing apparatus to a content management server.

Further features of the present invention will become apparent from the following description of exemplary embodiments (with reference to the attached drawings).

DESCRIPTION OF THE EMBODIMENTS

Hereinafter, the best mode for carrying out the present invention will be described with reference to the drawings and the like.

First Embodiment

Figure 1:
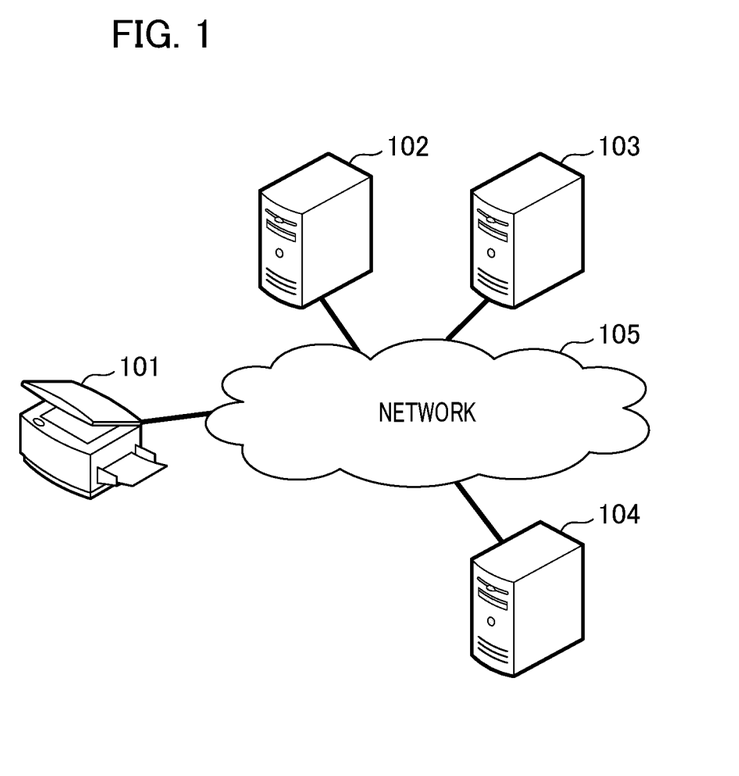
FIG. 1 is a diagram illustrating a configuration of a network system.

FIG. 1 illustrates a configuration of a network system including an information processing apparatus (image processing apparatus) according to the present embodiment. The system includes an image processing apparatus 101, a content management server 102, a content distribution server 103, and a monitoring server 104, which can communicate each other via a network 105. The image processing apparatus 101 is an example of information processing apparatuses in which an update apparatus operates. The image processing apparatus 101 according to the present embodiment combines functions of a printer, a scanner, a copy machine, a facsimile, and the like, as one apparatus. Additionally, the image processing apparatus 101 has a unique individual number assigned to the image processing apparatus.

The content management server 102 distributes firmware or applications to the image processing apparatus 101. Additionally, it holds, for example, the individual number, type, and version information of the image processing apparatus 101, and performs their management. Further, it accepts a distribution reservation from the monitoring server 104 to the image processing apparatus 101, which will be described below. The application to be distributed itself is saved in the content distribution server 103, and accordingly its URL is held. The content distribution server 103 distributes the firmware to the image processing apparatus 101, and holds the application to be distributed to the image processing apparatus 101. The monitoring server 104 collects and accumulates the information when an error occurs in the image processing apparatus 101 or when toner is out. Additionally, it performs the distribution reservations for the firmware and the application to the image processing apparatus 101, with respect to the content management server 102.

Figure 2:
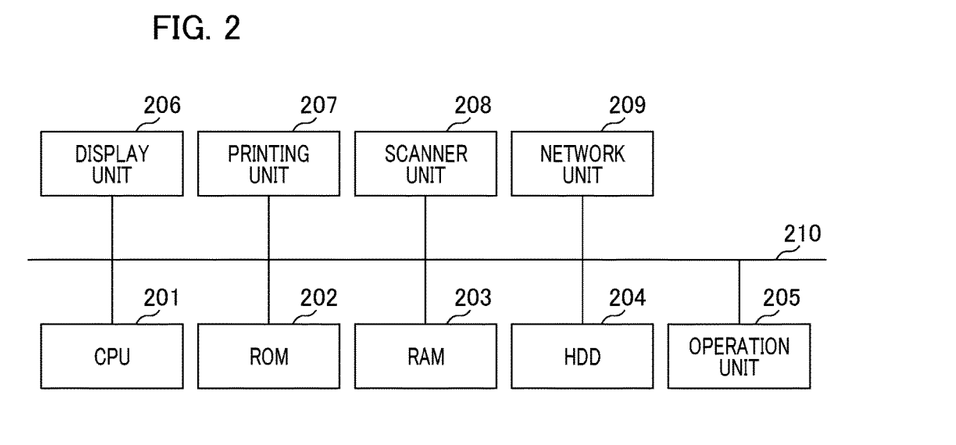
FIG. 2 is a diagram illustrating a hardware configuration of an image processing apparatus.

FIG. 2 illustrates a hardware configuration of the image processing apparatus 101. A CPU (Central Processing Unit) 201 is a unit that executes various programs and realizes various functions. A ROM (Read Only Memory) 202 is a unit that stores various programs. A RAM (Random Access Memory) 203 is a system working memory for operating the CPU 201 and is a memory for temporarily storing various data. The CPU 201 loads a program stored in the ROM 202 to the RAM 203 and executes the program. This RAM 203 is configured by FRAM (registered trademark) and SRAM that can hold the content that has been stored even after turning off the power, and DRAM in which the stored content is deleted after turning off the power.

A HDD (Hard Disk Drive) 204 is a unit that stores various programs. The CPU 201 loads a program that has been stored in the HDD 204 to the RAM 203 and executes it. Additionally, it is also possible to save the data of the RAM 203 in the HDD 204. An operation unit 205 is a unit for operating the image processing apparatus 101. A display unit 206 is a unit for displaying a UI of the image processing apparatus 101.

A printing unit 207 is a unit that can print various image data including a raster image on a recording medium and transmit it to an external device. A scanner unit 208 is a unit that reads a document placed on a scanning table and generates image data. A network unit 209 is a unit for connecting to the content management server 102, the content distribution server 103, and the monitoring server 104. Each unit of the image processing apparatus 101 described above can transmit and receive data via a bus 210.

Figure 3:
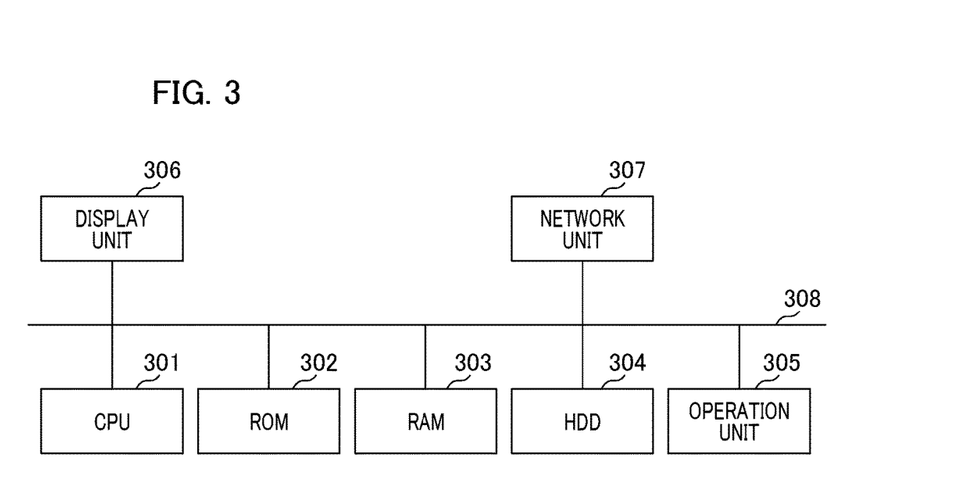
FIG. 3 is a diagram illustrating a hardware configuration of a content management server.

FIG. 3 is a diagram illustrating a hardware configuration of the content management server 102. Because a CPU 301 through a display unit 306 and a bus 308 are similar to the CPU 201 through the display unit 206, and the bus 210 shown in FIG. 2, the description thereof will be omitted. A network unit 307 is a unit for connecting to the image processing apparatus 101, the content distribution server 103, and the monitoring server 104.

Figure 4:
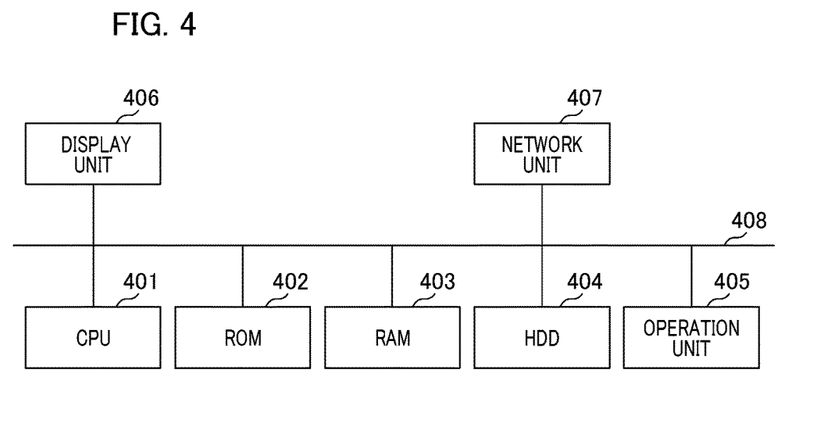
FIG. 4 is a diagram illustrating a hardware configuration of the content distribution server.

FIG. 4 illustrates a hardware configuration of the content distribution server 103. Because a CPU 401 through a display unit 406 and a bus 408 are similar to the CPU 301 through the display unit 306, and the bus 308 shown in FIG. 3, the description thereof will be omitted. A network unit 407 is a unit for connecting to the image processing apparatus 101, the content management server 102, and the monitoring server 104.

Figure 5:
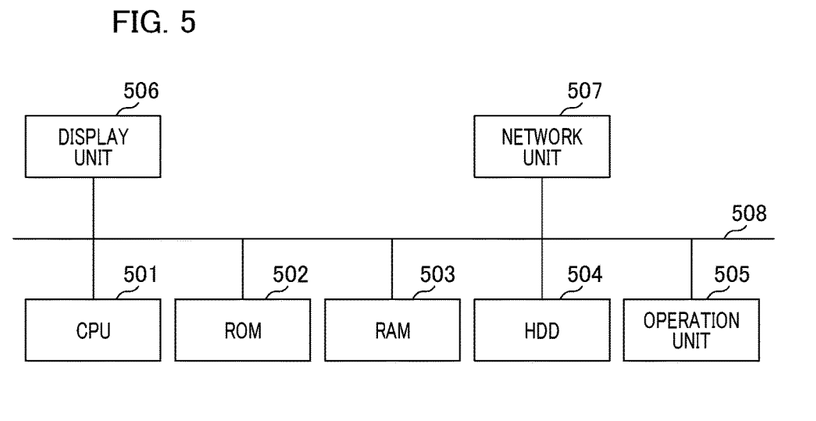
FIG. 5 is a diagram illustrating a hardware configuration of a monitoring server.

FIG. 5 illustrates a hardware configuration of the monitoring server 104. Because a CPU 501 through a display unit 506 and a bus 508 are similar to the CPU 301 through the display unit 306, and the bus 308 as shown in FIG. 3, the description thereof will be omitted. A network unit (acquisition unit) 507 is a unit for connecting to the image processing apparatus 101, the content management server 102, and the content distribution server 103.

Figure 6:
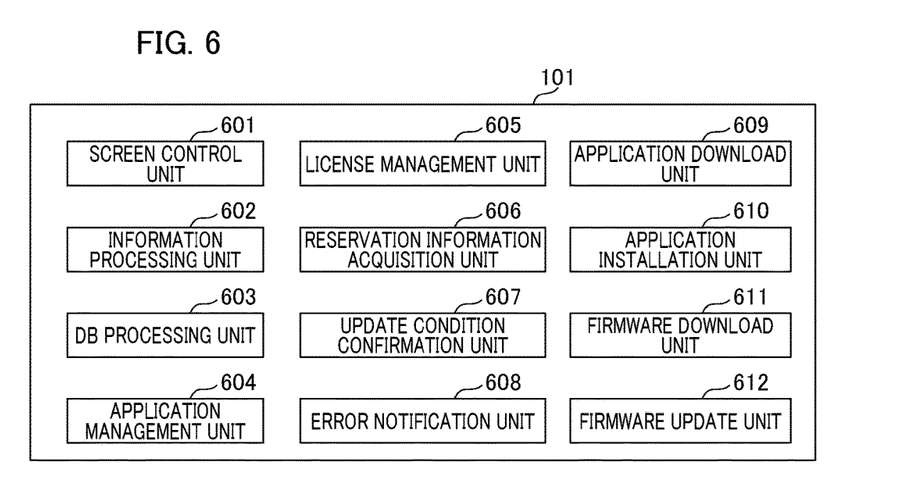
FIG. 6 is a diagram illustrating a software configuration of the image processing apparatus.

FIG. 6 illustrates a software configuration of the image processing apparatus 101. Programs that realize each configuration unit according to the present embodiment are stored on the HDD 204. Subsequently, those programs are loaded into the RAM 203, executed by the CPU 201, and each component is consequently realized.

A screen control unit 601 performs control of the menu display displayed on the display unit 206. An information processing unit 602 performs temporary saving of information, calculation, and the like. A DB processing unit 603 refers to DB information that is held in the image processing apparatus 101 and registers it. An application management unit 604 manages, for example, the identifier, version, and the start and stop of the installed application. A license management unit 605 manages license information such as the expiration period of the application, a decryption key for the application, and the like. A reservation information acquisition unit 606 acquires the reservation information set in the content management server 102. An update condition confirmation unit 607 determines whether or not the update of the application is required. An error notification unit (notification unit) 608 notifies the content management server 102 about error notifications.

An application download unit (first download unit) 609 downloads the application. An application installation unit (first update unit) 610 installs (updates) the application. A firmware download unit (second download unit) 611 downloads the firmware. A firmware update unit (second update unit) 612 updates the firmware. Note that, in the present embodiment, although the download and update of the application and the firmware are performed by individual configurations, the download and update of the application and firmware may by executed by one download unit and one upload unit.

Figure 7:
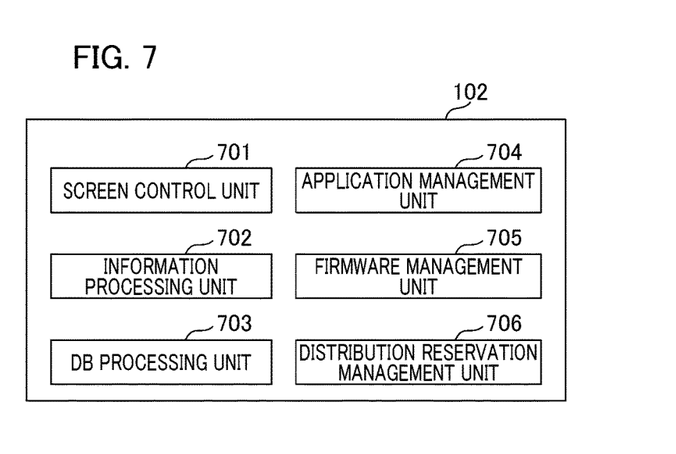
FIG. 7 is a diagram illustrating a software configuration of the content management server.

FIG. 7 illustrates a software configuration of the content management server 102. Programs that realize each configuration unit according to the present embodiment are stored in the HDD 304. Subsequently, those programs are loaded into the RAM 303, executed by the CPU 301, and consequently each configuration unit is realized.

A screen control unit 701 controls the menu display that performs distribution reservation of the firmware and the application. An information processing unit 702 performs the temporary saving of information, calculation, and the like. A DB processing unit 703 refers to the DB information held in the content management server 102 and registers it. An application management unit 704 has a function that registers the application, and manages application information such as the identifier, the version, and the like of the application. Additionally, it manages the URL of the content distribution server 103 that holds the application body. The firmware management unit 705 has a function that registers the firmware, manages firmware information including the identifier, the version and the like of the firmware, and manages the URL of the content distribution server 103 that stores the firmware body.

Figure 8:
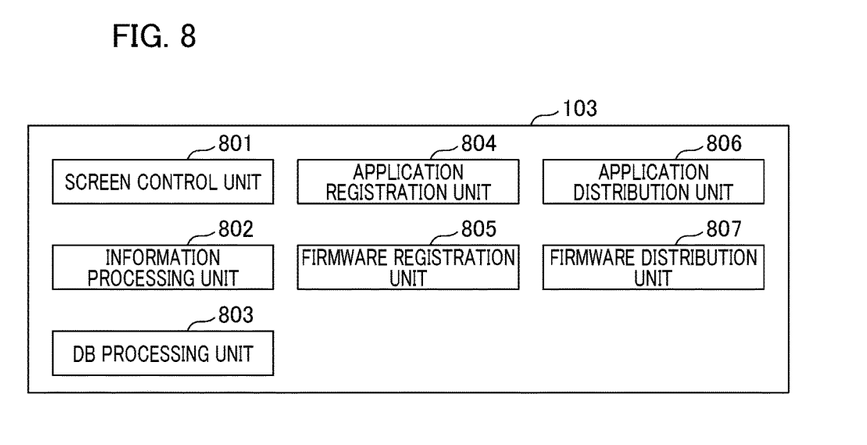
FIG. 8 is a diagram illustrating a software configuration of the content distribution server.

FIG. 8 illustrates a software configuration of the content distribution server 103. Programs that realize each configuration unit according to the present embodiment are stored in the HDD 404. Subsequently, those programs are loaded into the RAM 403, executed by the CPU 401, and consequently each configuration unit is realized.

A screen control unit 801 controls the management screen display. An information processing unit 802 performs the temporary saving of information, calculation, and the like. A DB processing unit 803 refers to the DB information that is held in the content distribution server 103 and registers it. An application registration unit 804 registers the application body. A firmware registration unit 805 registers the firmware body. An application distribution unit 806 distributes the application to the image processing apparatus 101. A firmware distribution unit 807 distributes the firmware to the image processing apparatus 101.

Figure 9:
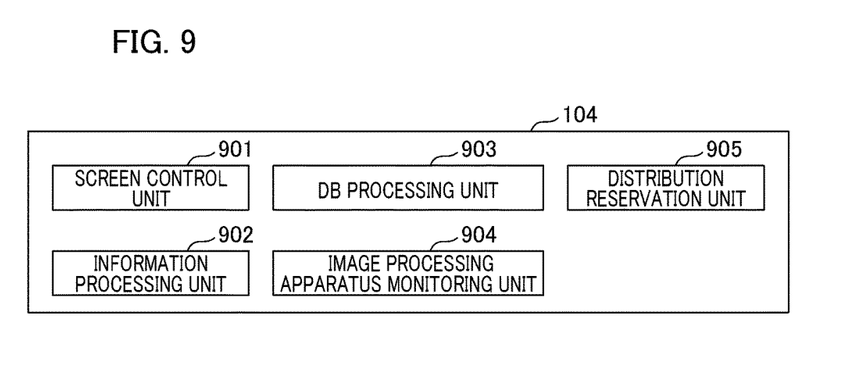
FIG. 9 is a diagram illustrating a software configuration of the monitoring server.

FIG. 9 illustrates a software configuration of the monitoring server 104. Programs that realize each configuration unit according to the present embodiment are stored in the HDD 504. Subsequently, those programs are loaded into the RAM 503, executed by the CPU 501, and consequently each configuration unit is realized.

A screen control unit 901 controls the display of the management screen. An information processing unit 902 performs, for example, the temporary saving of information and calculations. A DB processing unit 903 refers to the DB information held in the monitoring server 104 and registers it. An image processing apparatus monitoring unit 904 receives and monitors, for example, the occurrence of errors in the image processing apparatus 101. A distribution reservation unit 905 accesses the content management server 102, registers the reservation information in a distribution reservation management unit 706, and holds the presence or absence of the reservation.

Figure 10:
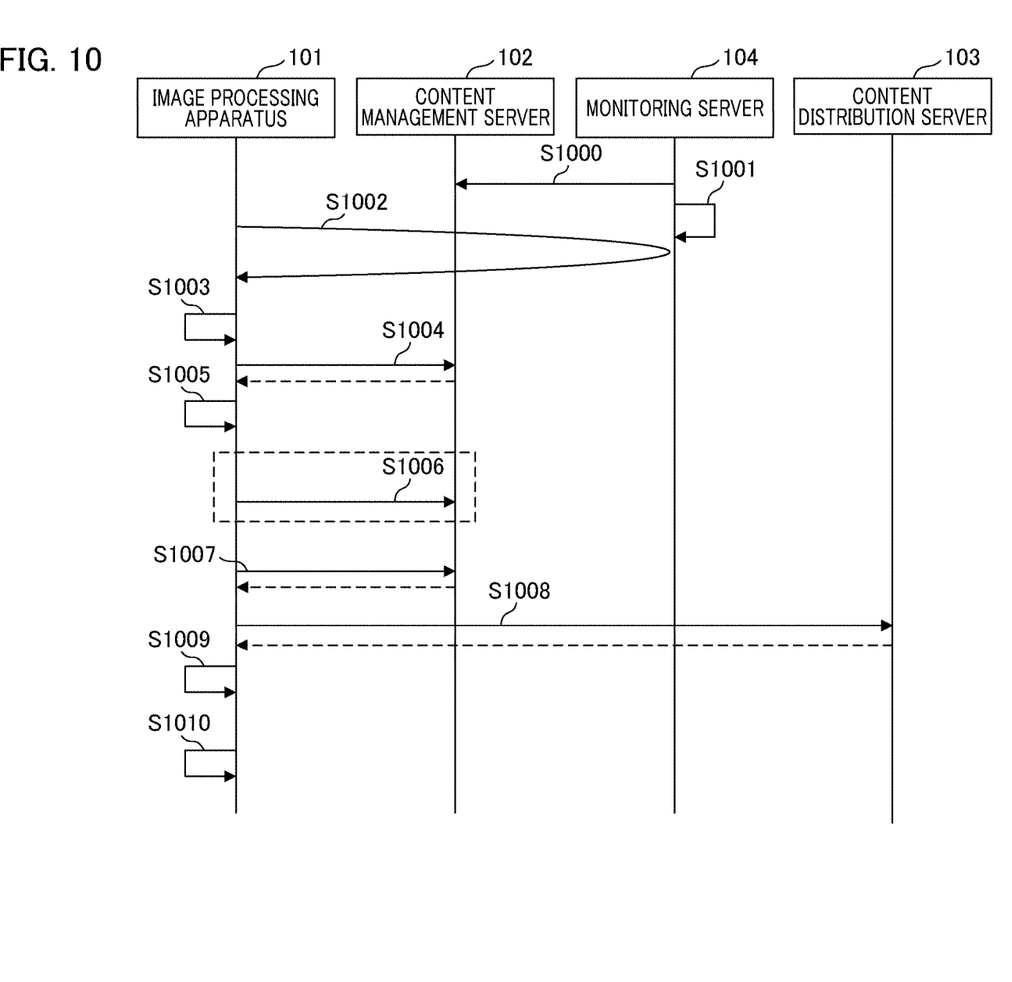
FIG. 10 is a flowchart illustrating a process from reservation to update.

FIG. 10 is a flowchart illustrating a series of process in which the image processing apparatus 101 acquires the reservation information that has been registered in the content management server 102 via the monitoring server 104, and updates the application. First, in step S1000, a service person makes the UI screen of the monitoring server 104 shift to the screen of the content management server 102, and performs registration of the update distribution reservation of the application. Next, in step S1001, the distribution reservation unit 905 of the monitoring server 104 holds the information "reservation information is present in the content management server 102". In step S1002, the reservation information acquisition unit 606 of the image processing apparatus 101 confirms whether or not the monitoring server 104 holds the information "reservation information is present" by polling at regular time intervals.

Here, if there is the information "reservation information is present", in step S1003, the reservation information acquisition unit 606 acquires the information of "reservation information is present". Subsequently, in step S1004, the reservation information acquisition unit 606 acquires the reservation information. Note that, in the present embodiment, there are two types of reservation information, the reservation information of the application and the reservation information of the firmware, where the reservation information of the application includes, for example, information about the application name, the application ID, and the version. Next, in step S1005, the update condition confirmation unit 607 determines the availability of an update based on the application ID, the version, and the like of the application that has been installed in the image processing apparatus 101.

Subsequently, if it is determined that the update is unavailable and unnecessary, in step S1006, the error notification unit 608 notifies the content management server 102 about an error notification. In contrast, if it is determined that the update is available, in step S1007, the application download unit 609 requests a URL for acquiring the application of the content management server 102. Subsequently, in step S1008, the application download unit 609 acquires the application from the content distribution server 103 based on the URL that has been acquired in step S1007. Next, in step S1009, the application installation unit 610 acquires the decryption key and license information of the application that has been installed in the image processing apparatus 101. Subsequently, in step S1010, the application installation unit 610 decrypts the application based on the decryption key and the license information that were acquired in step S1009, and receives the license information. As described above, the process from the reservation of a distributed application to the update ends.

Figure 11:
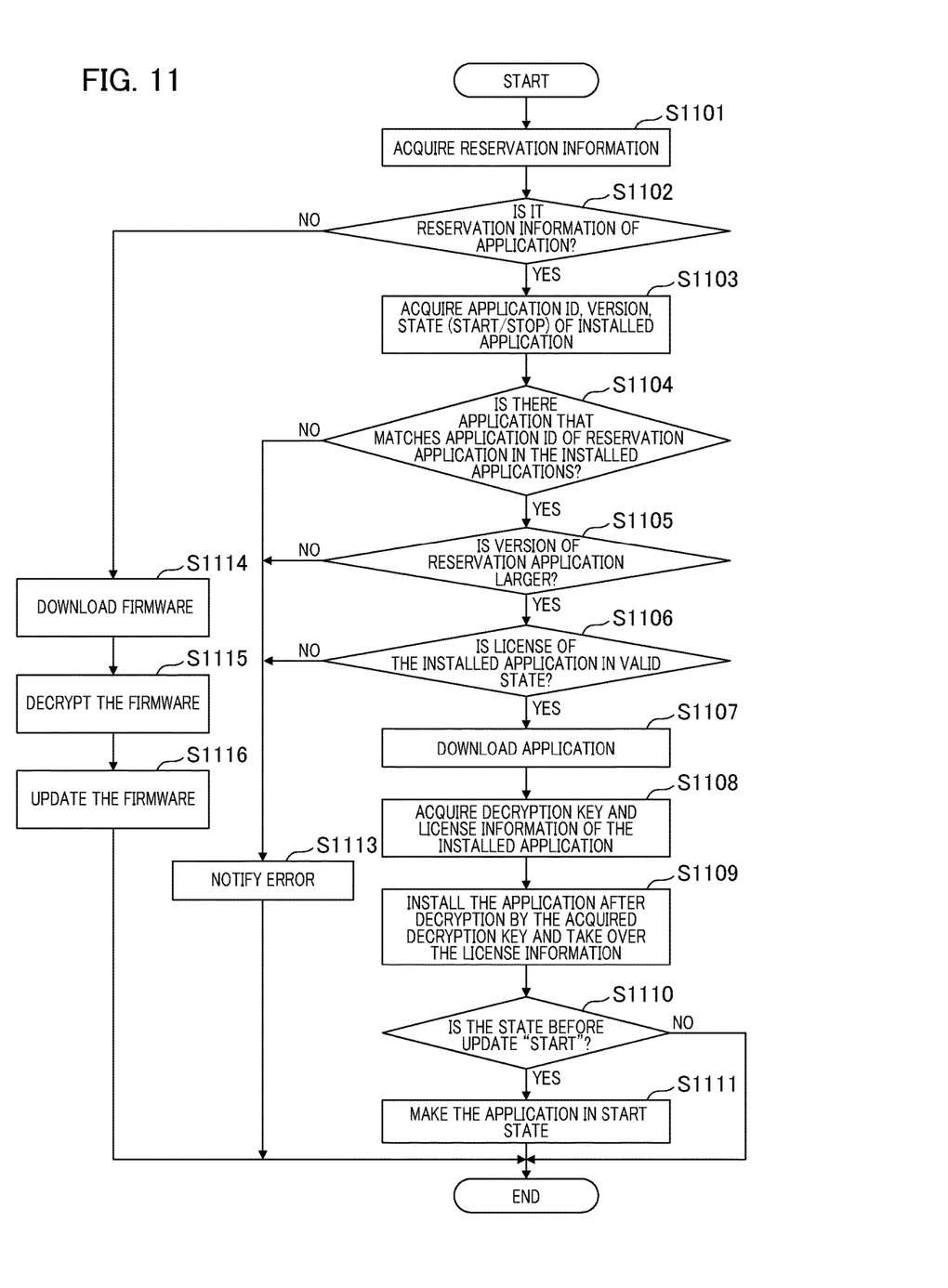
FIG. 11 is a flowchart of a process that performs an update of the application.

FIG. 11 is a flowchart illustrating a specific process of step S1004 through step S1010 in FIG. 10 that is performed by the image processing apparatus 101. First, in step S1101, the reservation information acquisition unit 606 acquires the reservation information from the content management server 102. Next, in step S1102, the reservation information acquisition unit 606 determines whether or not the reservation information that was acquired in step S1101 is the reservation information about the distributed application to be distributed.

If the reservation information is determined to be about the distributed application (YES), the process proceeds to step S1103. Subsequently, in step S1103, the update condition confirmation unit 607 acquires the application information that has been installed in the image processing apparatus 101, that is, the application ID, version, start-up state (start (running) or stop) from the application management unit 604. Next, in step S1104, the update condition confirmation unit 607 determines whether or not the application that matches the application ID of the distributed application included in the reservation information that has been received from the content management server 102 is present in the installed application.

If it is determined that an application that matches the application ID is present (YES), the process proceeds to step S1105, and the update condition confirmation unit 607 determines whether or not the version of the reservation application (distributed application) is later than the version of the installed application. If the version of the reservation application is determined to be later than that of the installed application (YES), the process proceeds to step S1106. Subsequently, in step S1106, the update condition confirmation unit 607 determines whether or not the license of the application that has been installed in the license management unit 605 is valid. If the license is determined to be valid (YES), the process proceeds to step S1107. Then, in step S1107, the application download unit 609 acquires a URL for acquiring the application from the content management server 102 and downloads the application from the content distribution server 103 based on the URL.

Next, in step S1108, the application installation unit 610 acquires the decryption key and license information of the installed application from the license management unit 605. Next, in step S1109, the application installation unit 610 installs the application that was downloaded after decryption by the decryption key acquired in step S1108, receives the license information, and updates the installed application. Next, in step S1110, the application installation unit 610 determines whether or not a state of the installed application before updating is in a start state based on the information that has been acquired in step S1102. That is, it is determined whether or not the operation (of the application) starts, for example, the installed application before updating (before installation of the downloaded application) is running. If the application is determined to be in the start state (YES), in step S1111, the application installation unit 610 makes the application in the start state, and ends the process. In contrast, if the state of application is determined not to be in the start state (NO), that is, it is in a stop state, the application installation unit 610 maintains the stop state and ends the process.

If no application to be matched is present (NO) in step S1104, if the version of the reservation information application is earlier in step S1105 (NO), or if the license is not valid in step S1106 (NO), the process proceeds to step S1113. Subsequently, in step S1113, the error notification unit 608 notifies the content management server 102 about an error notification, and ends the process.

If, in step S1102, the reservation information is determined not to be about the application, that is, if the reservation information is determined to be about the firmware (NO), the process proceeds to step S1114. Subsequently, in step S1114, the firmware download unit 611 downloads the firmware from the content distribution server 103. Next, in step S1115, the firmware update unit 612 decrypts the firmware. Next, in step S1116, it updates the firmware and ends the process.

The above process enables reliably executing an import update without transmitting the application information that has been installed in the image processing apparatus 101 to the content management server 102. Therefore, according to the present embodiment, even if the information that is necessary for an update cannot be transmitted from the image processing apparatus to the server, it is possible to provide an image processing apparatus that can update the application.

Second Embodiment

In the first embodiment, in step S1106 of FIG. 11, notification about an error was provided or the application was downloaded depending on "valid" or "expired" of the license of the application that has been installed in the license management unit 605. However, there are cases in which the state of license is other than "valid" in a state in which the application is installed in the image processing apparatus 101. Accordingly, in the present embodiment, a description will be given of a case in which the state of license is other than "valid".

Figure 12:
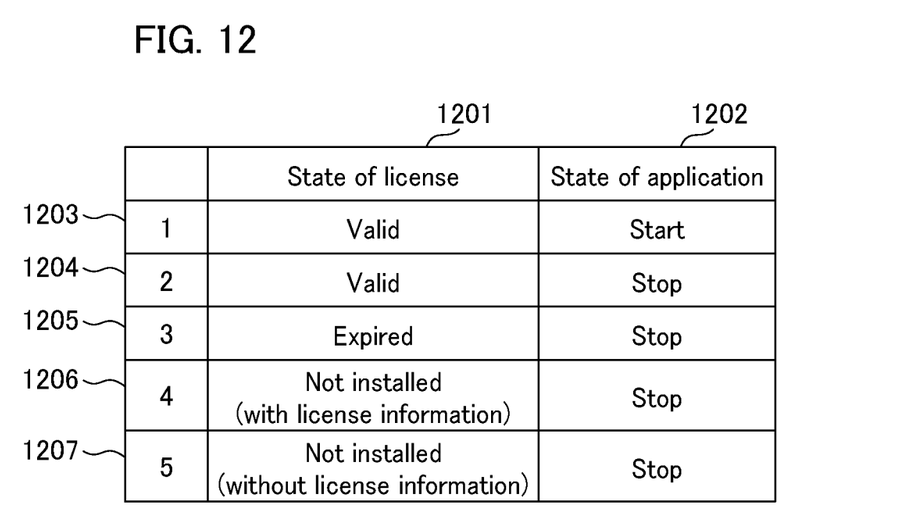
FIG. 12 is a table illustrating a combination pattern of a state of license and a state of application.

FIG. 12 is a diagram illustrating a combination of a state of a license held in the license management unit 605 and a state of an application held in the application management unit 604. Although four patterns, "valid", "expired", "not installed (with license information)", "not installed (without license information)" are used as the state of a license in the present embodiment, the present invention is not limited thereby, and other states of a license may be used.

In this context, the term "valid" indicates a state in which the license has already been installed, and the application can be used (can start). Additionally, the term "expired" indicates a state in which the expiration period of the license has been exceeded and the application cannot be used (cannot start). Moreover, the term "not installed (with license information)" indicates a state in which the license in a "valid" or "expired" state is created in a file and the license is made in a suspended state, and the application is disabled (cannot start). Then, when the license in a "valid" state is created in a file, it is possible to eliminate the consumption of the expiration period from the time. Additionally, the term "not installed (without license information)" indicates a state in which the license in "valid" or "expired" state is created in a file and then deleted. Note that because the license information cannot be extracted if the license was deleted, taking over the license information is impossible.

In FIG. 12, a column 1201 indicates the state of license. A column 1202 indicates the state of application. A row 1203 indicates that the state of license is "valid", and the state of application is "start". A row 1204 indicates that the state of license is "valid", and the state of application is "stop". A row 1205 indicates that the state of license is "expired", and the state of application is "stop". A row 1206 indicates that the state of license is "not installed (with license information)", and the state of application is "stop". A row 1207 indicates the state of license is "not installed (without license information)", and the state of application is "stop".

In the present embodiment, cases in which the state of license is other than "valid" are row 1205, row 1206, and row 1207. In the first embodiment, the row 1203 and the row 1204, which are the cases of "valid" in the state of license in step S1106 of FIG. 11, are targets for updates.

However, in the cases in which the state of license is other than "valid", that is, the cases of row 1205, row 1206, and row 1207, a case in which the latest application is requested to be used soon is assumed at the timing when the license is returned to the valid state. However, in the case of row 1207, in which the state of license is "not installed (without license information)", because the license information is not left in the inside of the image processing apparatus 101, a key that decrypts the application is not left, so that the decryption of the application is impossible. Accordingly, in the present embodiment, in addition to row 1203 and row 1204, which are "valid" in the state of license, the case of row 1205, which is "expired" in the state of license, and the case of row 1206, which is "not installed (with license information)", are also taken as targets for updates.

However, as described above, the case of "not installed (with license information)" is a state in which the license in a state of "valid" or "expired" is created in a file and the license is made in a suspended state, and the application is disabled (cannot start). Accordingly, when the application in this state of license is updated, the state of license is created in a file from "valid" after updating and then returned to "not installed (with license information)" so as not to cause the expiration period to elapse.

Figure 13:
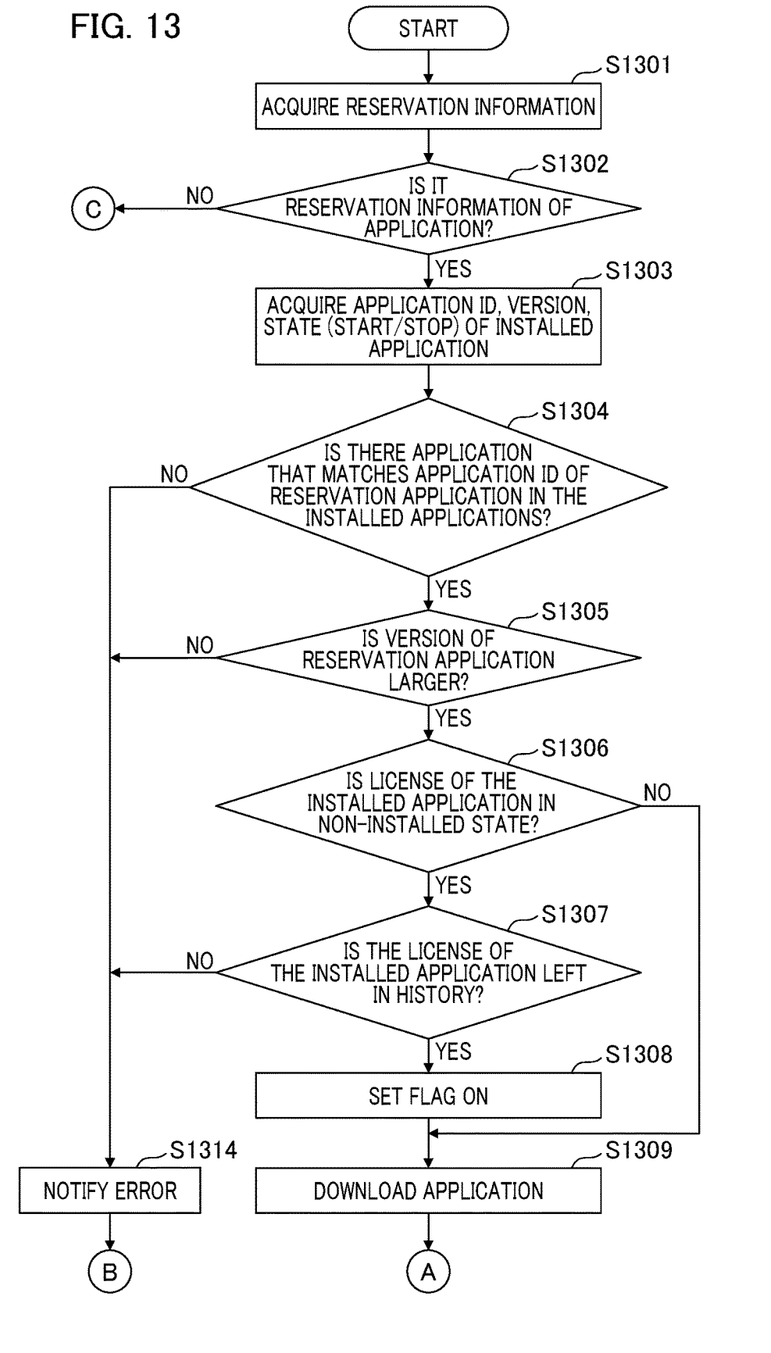
FIG. 13 is a flowchart illustrating an update process according to a second embodiment.
Figure 14:
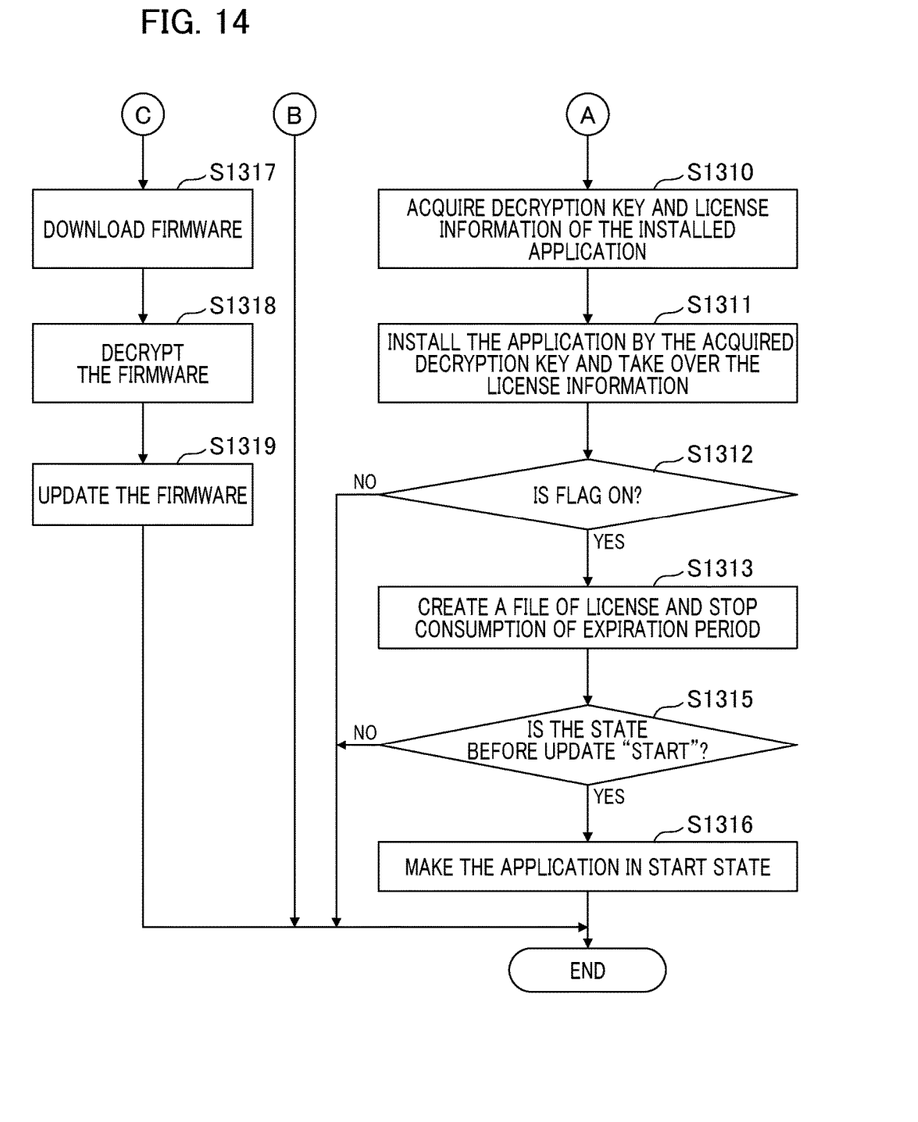
FIG. 14 is a flowchart illustrating an update process according to a second embodiment.

Similar to FIG. 11, FIGS. 13 and 14 are flowcharts illustrating the process from step S1004 through step S1010 of FIG. 10 performed in the image processing apparatus 101. In FIG. 11 of the first embodiment, although only the application in the state of license "valid" is a target for updates, in FIG. 13 of the present embodiment, the application in the state of license "expired" or "not installed (with license information)" is also a target for updates.

First, in step S1301, the reservation information acquisition unit 606 acquires the reservation information from the content management server 102. Next, in step S1302, the reservation information acquisition unit 606 determines whether or not the reservation information is about the application. If the reservation information is determined to be about the application (YES), the process proceeds to step S1303. Subsequently, in step S1303, the update condition confirmation unit 607 acquires the application ID, version, start-up state (start or stop) of the application that has been installed in the image processing apparatus 101 from the application management unit 604. Next, in step S1304, the update condition confirmation unit 607 determines whether or not the application that matches the application ID included in the reservation information that was received from the content management server 102 is present in the installed applications. If it is determined that the application that matches the application ID (YES) is present, the process proceeds to step S1305, and the update condition confirmation unit 607 determines whether or not the version of the reservation application is later than that of the installed application.

If the version of the reservation application is determined to be later than that of the installed application (YES), the process proceeds to step S1306. Subsequently, in step S1306, the update condition confirmation unit 607 determines whether or not the state of license of the application that has been installed in the license management unit 605 is in a not installed state, in other words, it is in a state of the 1206 or row 1207. If the state of license is a not installed state (YES), the process proceeds to step S1307, and if the state of license is not a not installed state (NO), the process proceeds to step S1309. Subsequently, in step S1307, the update condition confirmation unit 607 determines whether or not the license information of the application that has been installed in the license management unit 605 remains in the history, in other words, whether or not the state of license is the state of the 1206. If the license remains in the history (YES), the process proceeds to step S1308, and a flag is set on.

Subsequently, in step S1309, the application download unit 609 acquires the URL of the download site from the content management server 102, and downloads the application from the content distribution server 103. Next, in step S1310, the application installation unit 610 acquires the decryption key and license information of the application that has been installed. Next, in step S1311, the application installation unit 610 decrypts the application by the decryption key that was acquired in step S1310, installs it, and receives the license information.

Subsequently, in step S1312, the application installation unit 610 determines whether or not the flag is on. When the flag is on (YES), in step S1313, the application installation unit 610 creates a file of the license and stops the consumption of the expiration period. In other words, it makes the license of row 1206 be in a non-installed state (with license information). Next, in step S1315, the application installation unit 610 determines whether or not a pre-update state is in a start condition based on the information that was acquired in step S1302. If the pre-update state is in the start state (YES), the process proceeds to step S1316, and the application installation unit 610 makes the state of application be in the start state, and ends the process. In contrast, if the flag is not on in step S1312 (NO), and if the pre-update state is not the start state in step S1315 (NO), the process ends as-is.

Additionally, if it is determined that no application to be matched is present in step S1304 (NO), if the version of the reservation application is determined to be earlier than that of the installed application (NO), or if the license is not left in the history (NO), the process proceeds to step S1314. Then, in step S1314, the error notification unit 608 notifies the content management server 102 about an error, and the process ends.

In contrast, in step S1302, if the reservation information is not about the application (NO), that is, if it is about the firmware, the process proceeds to step S1317, and the firmware download unit 611 downloads the firmware from the content distribution server 103. Next, in step S1318, the firmware update unit 612 decrypts the firmware, and in step S1319, it updates the firmware, and process ends.

The above process enables reliably executing an important update even if the application in which the license has expired or is in an invalid state is present in the applications that have been installed in the image processing apparatus 101. Therefore, according to the present embodiment, it is possible to provide an image processing apparatus that can update the application even if the information required for update cannot be transmitted to the server from the image processing apparatus.

OTHER EMBODIMENTS

Embodiment (s) of the present invention can also be realized by a computer of a system or apparatus that reads out and executes computer executable instructions (eg, one or more programs) recorded on a storage medium (which may also be referred to more fully as a 'non-transitory computer-readable storage medium') to perform the functions of one or more of the above-described embodiment (s) and/or that includes one or more circuits (eg, application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (eg, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140749, filed Jul. 14, 2015 which is hereby incorporated by reference wherein in its entirety.

What is claimed is:

1. An image processing apparatus comprising:
a memory storing instructions; and
a processor which is configured to execute the instructions causing the image processing apparatus to:
acquire information about an installed application if reservation information acquired from a server is reservation information about a distributed application;
download the distributed application if the installed application matches the distributed application;

update the installed application by using the distributed application that has been downloaded;
download firmware if the acquired reservation information is reservation information about the firmware; and
configured to execute an update using the firmware that has been downloaded,
wherein, in the updating of the application, if a state of the installed application before update using the distributed application is a stop state, the state of the application is not set to a start state in order to make the state of the application after an update using the distributed application the stop state, and
wherein, in the updating of the application, if the state of the installed application before update using the distributed application is the start state, the state of the application after update using the distributed application is set to the start state.

2. The image processing apparatus according to claim 1, wherein the instructions cause the image processing apparatus to:
wherein the distributed application is downloaded if the version of the distributed application is later than that of the installed application, and
wherein the instructions further cause the image processing apparatus to provide notification about an error if the version of the distributed application is earlier than that of the installed application.

3. The image processing apparatus according to claim 1, wherein the distributed application is downloaded if the state of license of the installed application is a valid state, and
wherein the notification unit provides notification about the error if the state of license of the installed application is not the valid state.

4. The image processing apparatus according to claim 1, wherein the instructions further cause the image processing apparatus to provide notification about an error if the installed application does not match the distributed application.

5. The image processing apparatus according to claim 1, wherein the instructions further cause the image processing apparatus to:
acquire a decryption key of the installed application, and
perform the update using the distributed application that has been decrypted by the decryption key.

6. A control method of an image processing apparatus, the method comprising:
acquiring information of an installed application if reservation information acquired from a server is reservation information of a distributed application;
downloading the distributed application if the installed application matches the distributed application;
updating the installed application by using the distributed application that has been downloaded;
downloading firmware if the reservation information that has been acquired is reservation information of the firmware; and
executing an update using the firmware that has been downloaded,
wherein, in the updating, if a state of the installed application before an update using the distributed application is a stop state, the state of the application is not set to a start state in order to make the state of the application after update using the distributed application the stop state, and
wherein, in the updating, if the state of the installed application before update using the distributed application is the start state, the state of the application after update using the distributed application is set to the start state.

7. A non-transitory storage medium storing a computer program causing a computer to perform a control method of an image processing apparatus, the method comprising:
acquiring information of an installed application if reservation information acquired from a server is reservation information of a distributed application;
downloading the distributed application if the installed application matches the distributed application;
updating the installed application by using the distributed application that has been downloaded;
downloading firmware if the reservation information that has been acquired is reservation information of the firmware; and
executing an update using the firmware that has been downloaded,
wherein, in the updating, if a state of the installed application before an update using the distributed application is a stop state, the state of the application is not set to a start state in order to make the state of the application after update using the distributed application the stop state, and
wherein, in the updating, if the state of the installed application before update using the distributed application is the start state, the state of the application after update using the distributed application is set to the start state.

* * * * *